United States Patent [19]

Cherukuri et al.

[11] Patent Number: 4,497,832

[45] Date of Patent: Feb. 5, 1985

[54] CHEWING GUM COMPOSITION HAVING ENHANCED FLAVOR-SWEETNESS

[75] Inventors: S. Rao Cherukuri, Towaco, N.J.; Kenneth P. Bilka, Floral Park; Frank Hriscisce, Astoria, both of N.Y.

[73] Assignee: Warner-Lambert Company, Morris Plains, N.J.

[21] Appl. No.: 485,684

[22] Filed: Apr. 18, 1983

[51] Int. Cl.³ ............................................. A23G 3/30
[52] U.S. Cl. ...................................................... 426/5
[58] Field of Search ............................... 426/3, 5, 658

[56] References Cited

U.S. PATENT DOCUMENTS

| | | | |
|---|---|---|---|
| 1,171,392 | 2/1916 | Meier | 426/3 |
| 1,526,039 | 2/1925 | Arkell et al. | 426/3 |
| 3,930,026 | 12/1975 | Clark | 426/3 |
| 3,962,463 | 6/1976 | Witzel | 426/5 |
| 3,985,298 | 10/1976 | Nichols | 426/3 |
| 4,001,438 | 1/1977 | Marmo et al. | 426/3 |
| 4,248,894 | 2/1981 | Mackay | 426/3 |
| 4,259,355 | 3/1981 | Marmo et al. | 426/5 |

*Primary Examiner*—Jeanette Hunter
*Attorney, Agent, or Firm*—Gary M. Nath; Daniel Scola

[57] ABSTRACT

A sugar containing chewing gum composition containing a chewing gum base, a sweetener, and a flavoring agent sorbed in the microporous channels of spherical particles wherein the channels increase the particles sorptive surface area.

15 Claims, No Drawings

CHEWING GUM COMPOSITION HAVING ENHANCED FLAVOR-SWEETNESS

FIELD OF THE INVENTION

The present invention relates to a chewing gum composition and more particularly to a chewing gum composition having enhanced flavor-sweetness release.

BACKGROUND OF THE INVENTION

Most chewing gum compositions, including bubble gums, contain a generally water-insoluble gum base, water-soluble sweeteners that are either natural or artificial, and a flavoring that may be added in a variety of forms. Also, the gum may contain various additives such as plasticizers, softeners and bulking agents to improve consistency and to generally enhance the chewing experience.

A commonly noted deficiency in chewing gums has been the relatively rapid exhaustion of the flavor and sweetness sensation during chewing. This loss frequently occurs within the first 3 to 5 minutes of chewing.

The same problem is observed in the instance where the gum products are stored for a period of time between manufacture and consumption. The flavors appear to have limited shelf stability and, in some cases, are observed to diminish to an unacceptably low level within one month after storage.

Recently, it has become desirable to develop chewing gums and bubble gums having extended flavor and/or sweetener release.

U.S. Pat. No. 3,920,849 to Marmo et al addresses the concept of extended flavor release and offers a full discussion of the prior art on this subject. The patent directs itself to the preparation of separate flavor components identified as "fixed" (encapsulated) and "unfixed", which are mixed with a suspension agent prior to their addition to a chewing gum base. The patentees contend that this method of preparation and addition to the chewing gum offers improved flavor intensity and uniform flavor transmission. The patentees specifically employ a non-confined hydrophobic flavor oil and a "fixed" hydrolytically releasable flavor oil in combination with a solid suspending agent, as their flavor system. The preparation of the flavors is such that the resulting flavor system is added simultaneously to the gum base.

In similar fashion, U.S. Pat. No. 4,001,438 also to Marmo et al discloses a flavor composition utilizing a non-confined flavor oil in combination with a flavor oil physically entrapped within solid particles, and a suspending agent combined therewith. All of these ingredients are premixed and thereafter simultaneously added to the product to be flavored. It is significant that the flavor system of this patent is predicated upon an intimate admixture between the non-confined flavor oil and the entrapped flavor oil.

In contrast to the Marmo et al. technique, U.S. Pat. No. 3,826,847 to Ogawa et al. relates to encapsulation of flavoring oils with polyvinyl acetates, that is high molecular weight material. The encapsulated oil is thereafter incorporated into a chewing gum base. Ogawa et al purport to achieve sequential flavor delivery by the modulation of the coating applied to the respective flavor particles.

While the foregoing patents have been directed to flavor release, the art has concurrently developed to achieve prolonged sweetness release. U.S. Pat. No. 4,217,368 to Witzel is representative of one means utilized to delay sweetener release. This patented system involves using two phases, a watersoluble phase consisting essentially of softener and a first sweetener in particulate form and a relatively water-insoluble phase consisting of a plurality of separate and distinct masses suspended in the water-soluble phase, each of said masses comprising gum base and particles of a second sweetener enveloped in the gum base. The prior art has continued to explore encapsulation of sweeteners that will release over extended periods.

SUMMARY OF THE INVENTION

The instant invention concerns a novel chewing gum composition having more juiciness and flavor impact, and in particular enhanced flavor-sweetness release.

In accordance with the present invention, a sugar containing chewing gum composition is prepared that contain a chewing gum base having incorporated therein, sweetener, and spherical particle having microporous channels, and a flavoring agent, the flavoring agent being sorbed in the microporous channels of the spherical particles. The spherical particles used in the present invention have relatively low bulk densities and contain microporous channels that maximize the sorption capabilities of the particles. These channels increase the particles sorptive surface area and permit the particles to adsorb as well as absorb, nonaqueous liquids such as the flavoring liquid.

In a preferred embodiment, the chewing gum composition comprises a chewing gum base, sweetener, flavoring agent and maltodextrin as spherical particles having bulk densities of about 2.0 to about 25.0 lb/cu. ft. with a flavoring liquid sorbed therein. The use of such maltodextrins provides enhanced sweetness and prolonged flavor release without any adverse affects on chew characteristics. This product has a soft consistency and provides a gum of juicy taste. The use of such spherical binders to achieve the instant results is highly unexpected over conventional maltodextrins which have higher bulk densities, smaller particle sizes and no microporous channels.

DETAILED DESCRIPTION OF THE INVENTION

In accordance with the present invention there is provided a novel sugar containing chewing gum composition which comprises a chewing gum base having incorporated therein sweetener, spherical particles having microporous channels and a flavoring agent, the flavoring agent being sorbed in the microporous channels of the spherical particles.

Another aspect of the invention involves a method for preparing a sugar containing chewing gum composition with microporous spherical particles containing sorbed flavoring agents.

With regard to the chewing gum formulation in particular, the amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of $\alpha$-pinene or $\beta$-pinene; terpene resins including polyterpene and mixtures thereof. The solvent may be employed in an amount ranging from about 10% to about 75% and preferably about 45% to about 70% by weight of the gum base.

A variety of traditional ingredients such as plasticizers or softeners including lanolin, stearic acid, sodium stearate, potassium stearate, glyceryl triacetate, glycerine and the like for example, natural waxes, petroleum waxes, such as polyethylene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum compositions employing the instant gum bases are sugar-containing formulations. The term sweetening agents or sweeteners as used herein refer broadly to water-soluble sweetening agents. Without being limited to particular sweeteners representative illustrations of water-soluble sweetening agents include materials such as monosaccharides, disaccharides, and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol and mixtures thereof.

In general, the amount of sweetener will vary with the desired amount of sweetener selected for a particular chewing gum composition. The water-soluble sweeteners are preferably used in amounts of about 25% to about 75% by weight, and most preferably from about 50% to about 65% by weight of the final chewing gum composition.

The chewing gum composition of this invention may additionally include the conventional additives of coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

Flavoring agents well known to the chewing gum art may be added to the chewing gum compositions of the instant invention. These flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

The flavoring agent is preferably employed in its liquid oil form in order to achieve maximum sorption within the spherical particles. It is theorized that upon mixing the flavoring liquid and the spherical particles having a microporous channel structure that the flavoring liquid is entrapped within the intricacies of the structure and thereby contributing to the delay in flavor releases. This is indeed surprising and unexpected inasmuch as this effect was only previously obtainable through use of physical encapsulating procedures.

While the flavoring agent is employed in the oil form to maximize sorption, it should be recognized that additional flavoring agents having distinct physical forms may be added to the chewing gum composition. Without being limited thereto, such physical forms include spray dried, powdered flavoring, beaded flavoring and encapsulated flavoring.

The finished chewing gum containing the low bulk density spherical particles with sorbed flavor also unexpectedly exhibits enhanced sweetness release. This effect is theorized to occur jointly from the coating of the spherical particles with the sweetener, plus ready availability and removability of the sweetener coating with the flavoring agent. When the spherical particles are prepared from carbohydrate materials as hereinafter described, this effect appears to result from a joint action of solubilization wherein the sweetener and particles are removed concurrently with the flavoring liquid. Duration of sweetness and flavoring liquid release is then possible through delay in solubilizing the spherical particles.

The spherical particles useful in the invention include any edible food material which is capable of being formed into particles having microporous channels. The products have preferred low bulk densities in the range of about 2.0 to about 25 lb./ft.$^3$ and preferably about 3.0 to about 6.0 lb./ft.$^3$. Materials, not having low bulk densities, coupled with microporous channels have been found not suitable for use in the inventive formulations. Such materials have been found to quickly release the flavoring liquid from the formulation and fail to sustain flavor-sweetness duration.

The spherical particles of the invention may be produced from a wide range of materials. Without being limited thereto, illustrative materials are carbohydrates such as the dextrins, starch, pectin, algin, methyl cellulose, carboxy methyl cellulose, carboxy methyl amylose, carboxy methylamylopectin, dextrose, fructose, maltose, lactose, dextrins, natural gums and mixtures thereof. Exemplary natural gums include tragacanth, acacia, arabic, locus bean, caraya, and carragean.

Such materials are commercially available and may be prepared by spray drying previously expanded particles in a heated zone. The exact manner of production does not constitute a part of the instant invention.

For illustrative purposes, however, a preferred process for preparing the spherical particles useful in the instant formulations is described in U.S. Pat. No. 4,180,593 to Cohan, which reference teachings are incorporated herein by reference. Briefly the reference process involves spraying a flowable composition in the presence of a blowing agent, such as ammonium bicarbonate, to form beads, subjecting the beads to a heated zone to expand the beads by expansion of gases within the interior of the beads, and cooling the resulting expanded beads to stop further expansion and aid in control of bulk density.

The spherical particles are employed in the chewing gum formulations in amounts of about 0.1% to about 12% by weight and preferably about 0.5% to about 6% by weight based on the weight of the final formulation. Amounts less than 0.1% fail to achieve enhanced flavor and sweetness perception whereas amounts higher than 12% does not achieve a pleasing flavor sweetness release.

The preferred spherical particle for use with this invention is a maltodextrin. This maltodextrin is distinct from known maltodextrins which have distinct particle sizes and are void of a microporous channel structure. Such conventional maltodextrins or corn syrup solids as they are commonly referred to, have bulk densities from 15 to 46 lb./ft.$^3$ and D.E. values from 7 to 38. Such materials are unsuitable for use in the present invention in lieu of the microporous particles. It should be recognized that such maltodextrins may be used in the instant formulations in addition to the spherical microporous particles. When used in this manner, they may be used in conventional amounts well known to the skilled inventor.

The spherical particles may be incorporated into an otherwise conventional chewing gum formulation using standard techniques and equipment known to those skilled in the art. In a typical embodiment the chewing gum base is blended with a plasticizer together with the optional additives such as fillers and coloring agents under heat to plasticize the blend as well as to modulate the hardness, viscoelasticity and formability of the base. The heating temperature may vary widely but is for practical purposes preferably around 70° C. to 120° C. The chewing gum base is then blended with the spherical particles and sweetening agent. The spherical particles may have been previously blended with other ingredients including the flavoring agent. Once blending is achieved the remaining ingredient of the formulation are blended and the chewing gum formulation removed and formed into any suitable shape.

More preferably, the gums can be prepared by first melting the gum base at a temperature from 70° to 120° C. and mixing the gum base in a kettle with the liquid softener (corn syrup) and emulsifier (lethicin). Mixing is continued for 2 to 8 minutes. To this mixture ⅔ to ¾ of the sweetening agents, colors and the maltodextrin component are added and mixed for 1 to 4 minutes. The remaining sweeteners are added and while mixing is continued the flavor agent is slowly added. Mixing is continued for 2 to 4 minutes at which time humectant can be added and mixing is continued 1 to 4 minutes.

The gum is discharged from the kettle and formed into its final shape such as strips, slabs, chunks, balls, ropes. It also can be center filled.

A preferred process involves (a) admixing a chewing gum base at a temperature from about 70° to about 120° C. with a liquid softener to obtain a homogenous pliable mixture;

(b) while mixing add to the homogeneous pliable mixture spherical particles having a flavoring agent sorbed therein;

(c) add the remaining chewing gum ingredients; and (d) thereafter forming the mixture into suitable chewing gum shapes.

An alternative preferred process involves (a) admixing a chewing gum base at a temperature from about 70° C. to about 120° C. with a liquid softener to obtain a homogeneous pliable mixture;

(b) add to the homogeneous pliable mixture a sweetening agent and a spherical particles having microporous channels;

(c) while continuing mixing, add a flavoring agent and optional remaining ingredients to uniformly mix the flavoring agent throughout the chewing gum base to enable the flavoring agent to be sorbed in the spherical particles; and (d) thereafter forming the mixture into suitable chewing gum shapes.

The following examples are given to illustrate the invention, but are not deemed to be limiting thereof. All percentages given throughout the specification are based upon weight unless otherwise indicated.

EXAMPLE I

This example demonstrates the use of modified maltodextrins according to this invention to prepare a sugar containing chewing gum.

Chewing gum formulations are prepared with the ingredients recited in Table I in the absence and presence of various maltodextrins. The formulations were prepared by first melting the gum base at a temperature from 82° to 94° C. and mixing the gum base in a kettle with the corn syrup and caramel paste. Mixing is continued for approximately 2 minutes to obtain a homogeneous mixture. To this mixture sugar, color glycerin, oil, flavor and the maltodextrin components is mixed and is continued for approximately 5 minutes.

The gum is then discharged from the kettle and formed into chunks and cooled to room temperature.

In this example, Comparative Run A did not employ any maltodextrin; Comparative Run B employed a conventional maltodextrin having a bulk density of 32 lbs./ft.$^3$ identified as MALTRIN 100 obtained from Grain Processing Corporation; and Inventive Run employed a modified maltodextrin having a bulk density of 3 to 6 lbs./ft.$^3$.

In order to evaluate the chewing gum formulation a comparison was undertaken with two control formulations, one prepared without the maltodextrin and a second prepared with conventional maltodextrin having a bulk density of 32 lbs./ft.$^3$.

The formulations were subjected to test panel studies with multiple panelists. The results demonstrated the enhanced sweetness and reduced flavor taste achieved from the inventive formulations over the comparative formulations.

EXAMPLE II

This example also demonstrates the use of modified maltodextrins according to this invention to prepare a sugar containing chewing gum.

Chewing gum formulations are prepared with the ingredients recited in Table II in the absence and presence of various maltodextrins. The formulations were prepared by first melting the gum base at a temperature from 82° to 94° C. and mixing the gum base in a kettle with the corn syrup and caramel paste. Mixing is continued for approximately 2 minutes to obtain a homogeneous mixture. To this mixture sugar, color glycerin, oil, flavor and the maltodextrin component is mixed and is continued for approximately 5 minutes.

The gum is then discharged from the kettle and formed into chunks and cooled to room temperature.

In this example, Comparative Run A did not employ any maltodextrin; Comparative Run B employed a conventional maltodextrin having a bulk density of 32 lbs./ft.$^3$ identified as MALTRIN 100 obtained from Grain Processing Corporation; and Inventive Run employed a modified maltodextrin having a bulk density of 3 to 6 lbs./ft.$^3$ In order to evaluate the chewing gum formulation a comparison was undertaken with two control formulations, one prepared without the maltodextrin and a second prepared with conventional maltodextrin having a bulk density of 32 lbs./ft.$^3$.

The formulations were subjected to test panel studies with multiple panelists. The results demonstrated the enhanced sweetness and a better flavor release achieved from the inventive formulation over the comparative formulation.

EXAMPLES III-IX

These Examples also demonstrate the use of the modified maltodextrins according to this invention to prepare a sugar containing chewing gum.

Chewing gum formulations are prepared with the ingredients recited in Tables III to IX in the absence and presence of various maltodextrins. The formulations were prepared by first melting the gum base at a temperature from 82° to 94° C. and mixing the gum base in a kettle with the corn syrup and lecithin. Mixing is continued for approximately 6 minutes to obtain a homogeneous mixture. To this mixture is then added ⅔ sugar, dextrose, color and the maltodextrin component and mixing is continued for approximately 3 minutes. The remaining ⅓ sugar is added and while mixing is continued, the flavor slowly added. Mixing is maintained for approximately 4 minutes at which time the glycerin is added and mixing continued for an additional 3 minutes.

The gum is then discharged from the kettle and formed into strips having a thickness of 0.18 centimeters and cooled to room temperature.

In these examples, Comparative Runs A did not employ any maltodextrin; Comparative Runs B employed a conventional maltodextrin having a bulk density of 32 lbs./ft.$^3$ identified as MALTRIN 100 obtained from Grain Processing Corporation; and Inventive Run employed a modified maltodextrin having a bulk density of 3 to 6 lbs./ft.$^3$ In order to evaluate the chewing gum formulation a comparison was undertaken with two control formulations, one prepared without the maltodextrin and a second prepared with conventional maltodextrin having a bulk density of 32 lbs./ft.$^3$.

The formulations were subjected to test panel studies with multiple panelists. The results demonstrated the enhanced sweetness and better flavor release achieved from the inventive formulations over the comparative formulations.

EXAMPLE X

This example demonstrates the use of the modified maltodextrins according to this invention to prepare a sugar containing chewing gum.

Chewing gum formulations are prepared with the ingredients recited in Table X in the absence and presence of various maltodextrins. The formulations were prepared by first melting the gum base at a temperature from 82° to 94° C. and mixing the gum base in a kettle with the corn syrup and lecithin. Mixing is continued for approximately 6 minutes to obtain a homogeneous mixture. To this mixture is then added ⅔ sugar, dextrose, color and the maltodextrin component and mixed is continued for approximately 3 minutes. The remaining ⅓ sugar is added and while mixing is continued, the flavor slowly added. Mixing is maintained for approximately 4 minutes at which time the glycerin is added and mixing continued for an additional 3 minutes.

The gum is then discharged from the kettle and formed into strips having a thickness of 0.18 centimeters and cooled to room temperature.

In this example, Comparative Run A did not employ any maltodextrin; Comparative Run B employed a conventional maltodextrin having a bulk density of 32 lbs./ft.$^3$ identified as MALTRIN 100 obtained from Grain Processing Corporation; and Inventive Run employed a modified maltodextrin having a bulk density of 3 to 6 lbs./ft.$^3$.

In order to evaluate the chewing gum formulation, a comparison was undertaken with two control formulations, one prepared without the maltodextrin and a second prepared with conventional maltodextrin having a bulk density of 32 lbs./ft.$^3$.

The formulations were subjected to test panel studies with multiple panelists. The results demonstrated the enhanced sweetness and better flavor release achieved from the inventive formulations over the comparative formulations.

EXAMPLE XI

This example demonstrates the use of the modified maltodextrins according to this invention to prepare a sugar containing chewing gum.

Chewing gum formulations are prepared with the ingredients recited in Table XI in the absence and presence of various maltodextrins. The formulations were prepared by first melting the gum base at a temperature from 82° to 94° C. and mixing the gum base in a kettle with the corn syrup and lecithin. Mixing is continued for approximately 6 minutes to obtain a homogeneous mixture. To this mixture is then added ⅔ sugar, dextrose, color and the maltodextrin component and mixed is continued for approximately 3 minutes. The remaining ⅓ sugar is added and while mixing is continued, the flavor slowly added. Mixing is maintained for approximately 4 minutes at which time the glycerin is added and mixing continued for an additional 3 minutes.

The gum is then discharged from the kettle and formed into strips having a thickness of 0.18 centimeters and cooled to room temperature.

In this example, Comparative Run A did not employ any maltodextrin; Comparative Run B employed a conventional maltodextrin having a bulk density of 32 lbs./ft.³ identified as MALTRIN 100 obtained from Grain Processing Corporation; and Inventive Run employed a modified maltodextrin having a bulk density of 3 to 6 lbs./ft.³.

In order to evaluate the chewing gum formulation, a comparison was undertaken with two control formulations, one prepared without the maltodextrin and a second prepared with conventional maltodextrin having a bulk density of 32 lbs./ft.³.

The formulations were subjected to test panel studies with multiple panelists. The results demonstrated the enhanced sweetness and better flavor release achieved from the inventive formulations over the comparative formulations.

EXAMPLES XII TO XIV

This example demonstrates the use of the modified maltodextrins according to this invention to prepare a sugar containing chewing gum.

Chewing gum formulations are prepared with the ingredients recited in Table XII to XIV in the absence and presence of various maltodextrins. The formulations were prepared by first melting the gum base at a temperature from 82° to 94° C. and mixing the gum base in a kettle with the corn syrup for approximately 2 minutes. To this mixture is then added the sugar, color and the maltodextrin component. The kettle is started and while mixing is in progress the flavor is slowly added. Mixing is maintained for approximately 4 minutes.

The gum is then discharged from the kettle and formed into slabs having a thickness of 1.03 centimeters and cooled to room temperature.

In this example, Comparative Run A did not employ any maltodextrin; Comparative Run B employed a conventional maltodextrin having a bulk density of 32 lbs./ft.³ identified as MALTRIN 100 obtained from Grain Processing Corporation; and Inventive Run employed a modified maltodextrin having a bulk density of 3 to 6 lbs./ft.³

In order to evaluate the chewing gum formulation, a comparison was undertaken with two control formulations, one prepared without the maltodextrin and a second prepared with conventional maltodextrin having a bulk density of 32 lbs./ft.³.

The formulations were subjected to test panel studies with multiple panelists. The results demonstrated the enhanced sweetness and a better flavor release achieved from the inventive formulations over the comparative formulations.

TABLE I

| INGREDIENT | COMPARATIVE A | COMPARATIVE B | INVENTIVE |
|---|---|---|---|
| Gum Base | 16.87 | 16.87 | 16.87 |
| Corn Syrup 1632 | 24.92 | 24.92 | 24.92 |
| Sugar (powdered) | 41.70 | 40.20 | 40.20 |
| Sugar (granula) | 13.05 | 13.05 | 13.05 |
| Caramel Paste | 1.96 | 1.96 | 1.96 |
| Glycerin | 0.59 | 0.59 | 0.59 |
| Color | 0.13 | 0.13 | 0.13 |
| Oil | 0.33 | 0.33 | 0.33 |
| Flavor (strawberry) | 0.45 | 0.45 | 0.45 |
| Maltodextrin | None | 1.5 | 1.5 |

TABLE II

| INGREDIENT | COMPARATIVE A | COMPARATIVE B | INVENTIVE |
|---|---|---|---|
| Gum Base | 16.87 | 16.87 | 16.87 |
| Corn Syrup 1632 | 24.92 | 24.92 | 24.92 |
| Sugar (powdered) | 41.70 | 38.70 | 38.70 |
| Sugar (granula) | 13.05 | 13.05 | 13.05 |
| Caramel Paste | 1.96 | 1.96 | 1.96 |
| Glycerin | 0.59 | 0.59 | 0.59 |
| Color | 0.13 | 0.13 | 0.13 |
| Oil | 0.33 | 0.33 | 0.33 |
| Flavor (strawberry) | 0.45 | 0.45 | 0.45 |
| Maltodextrin | None | 3.0 | 3.0 |

TABLE III

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.0 | 16.0 | 16.0 |
| Sugar (powdered) | 55.45 | 54.7 | 54.7 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 0.8 | 0.8 | 0.8 |
| Maltodextrin | None | 0.75 | 0.75 |

TABLE IV

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.0 | 16.0 | 16.0 |
| Sugar (powdered) | 55.45 | 49.905 | 49.905 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 0.8 | 0.8 | 0.8 |
| Maltodextrin | None | 5.545 | 5.545 |

TABLE V

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.0 | 16.0 | 16.0 |
| Sugar (powdered) | 55.45 | 44.45 | 44.45 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 0.8 | 0.8 | 0.8 |
| Maltodextrin | None | 11.00 | 11.00 |

TABLE VI

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.5 | 16.5 | 16.5 |
| Sugar (powdered) | 54.90 | 54.15 | 54.15 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |

TABLE VI-continued

| INGREDIENT | COMPARATIVE A | COMPARATIVE B | INVENTIVE |
|---|---|---|---|
| Flavor (peppermint oil) | 0.85 | 0.85 | 0.85 |
| Maltodextrin | None | 0.75 | 0.75 |

TABLE VII

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.5 | 16.5 | 16.5 |
| Sugar (powdered) | 54.90 | 53.4 | 53.4 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 0.85 | 0.85 | 0.85 |
| Maltodextrin | None | 1.5 | 1.5 |

TABLE VIII

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.5 | 16.5 | 16.5 |
| Sugar (powdered) | 54.85 | 54.1 | 54.1 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 0.9 | 0.9 | 0.9 |
| Maltodextrin | None | 0.75 | 0.75 |

TABLE IX

| INGREDIENT | COMPARATIVE A | COMPARATIVE B | INVENTIVE |
|---|---|---|---|
| Gum Base | 21.0 | 21.0 | 21.0 |
| Corn Syrup (44° Be) | 16.5 | 16.5 | 16.5 |
| Sugar (powdered) | 54.75 | 54.0 | 54.0 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (peppermint oil) | 1.0 | 1.0 | 1.0 |
| Maltodextrin | None | 0.75 | 0.75 |

TABLE X

| INGREDIENT | COMPARATIVE A | COMPARATIVE B | INVENTIVE |
|---|---|---|---|
| Gum Base | 21.0 | 21.0 | 21.0 |
| Corn Syrup 44° Be | 16.5 | 16.5 | 16.5 |
| Sugar (powdered) | 54.9 | 54.15 | 54.15 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor (fruit) | 0.85 | 0.85 | 0.85 |
| Maltodextrin | None | 0.75 | 0.75 |

TABLE XI

| INGREDIENT | COMPARATIVE A | COMPARATIVE B | INVENTIVE |
|---|---|---|---|
| Gum Base | 21.0 | 21.0 | 21.0 |
| Corn Syrup 44° Be | 17.0 | 17.0 | 17.0 |
| Sugar (powdered) | 53.9 | 53.15 | 53.15 |
| Dextrose | 6.0 | 6.0 | 6.0 |
| Glycerin | 0.45 | 0.45 | 0.45 |
| Lecithin | 0.2 | 0.2 | 0.2 |
| Color | 0.1 | 0.1 | 0.1 |
| Flavor Liquid (spearmint) | 0.85 | 0.85 | 0.85 |
| Flavor Powdered (spearmint) | 0.5 | 0.5 | 0.5 |
| Maltodextrin | None | 0.75 | 0.75 |

TABLE XII

| INGREDIENT | COMPARATIVE A | COMPARATIVE B | INVENTIVE |
|---|---|---|---|
| Gum Base | 25.56 | 25.56 | 25.56 |
| Corn Syrup (44° Be) | 14.80 | 14.80 | 14.80 |
| Sugar (powdered) | 58.34 | 57.59 | 57.59 |
| Color | 0.17 | 0.17 | 0.17 |
| Flavor (spearming) | 1.13 | 1.13 | 1.13 |
| Maltodextrin | None | 0.75 | 0.75 |

TABLE XIII

| INGREDIENT | COMPARATIVE A | COMPARATIVE B | INVENTIVE |
|---|---|---|---|
| Gum Base | 25.56 | 25.56 | 25.56 |
| Corn Syrup (44° Be) | 14.80 | 14.80 | 14.80 |
| Sugar (powdered) | 58.34 | 56.84 | 56.84 |
| Color | 0.17 | 0.17 | 0.17 |
| Flavor (spearming) | 1.13 | 1.13 | 1.13 |
| Maltodextrin | tc None | 1.5 | 1.5 |

TABLE XIV

| INGREDIENT | COMPARATIVE A | COMPARATIVE B | INVENTIVE |
|---|---|---|---|
| Gum Base | 25.56 | 25.56 | 25.56 |
| Corn Syrup (44° Be) | 14.80 | 14.80 | 14.80 |
| Sugar (powdered) | 58.04 | 57.29 | 57.29 |
| Color | 0.17 | 0.17 | 0.17 |
| Flavor (spearming) | 1.43 | 1.43 | 1.43 |
| Maltodextrin | None | 0.75 | 0.75 |

The results from the panel tests demonstrated the perception of a special sweetness, that has higher juiciness, coupled to a decrease in the amount of harshness attributable to the flavor perception normally found when the microporous spherical particles were not used. It was found that the decrease in flavor harshness enabled use of increased amounts of flavor to yield longer flavor release. These two unexpected properties result in a longer lasting, juicy, sweet chewing gum.

This invention being thus described, it will be obvious that the same may be varied in may ways. Such variations are not to be regarded as a departure from the spirit and scope of the invention and all such modifications are intended to be included within the scope of the following claims.

We claim:

1. A sugar containing chewing gum composition, which comprises a chewing gum base having incorporated therein a sweetener, and a flavoring agent sorbed in the microporous channels of water-soluble spherical particles having a bulk density of about 3.0 to about 6.0 lbs./cu. ft.

2. The chewing gum composition of claim 1 wherein the spherical particles are present in the amount of about 0.1 to about 12% by weight of the final chewing gum formulation.

3. The chewing gum composition of claim 1 wherein the flavoring agent is a flavoring liquid.

4. The chewing gum composition of claim 1 wherein the spherical particles are selected from the group consisting of dextrins, starch, pectin, algin, methyl cellulose, carboxy methyl cellulose, carboxy methyl amylose, carboxy methyl amylopectin, dextrose, fructose, maltose, lactose, dextrans, natural gums and mixtures thereof.

5. The chewing gum composition of claim 1 wherein the spherical particles are maltodextrins having a bulk density of about 3.0 to about 6.0 lbs./cu. ft.

6. The chewing gum composition of claim 1 wherein the flavoring agent is present in the amount of about 0.05% to about 3.0% by weight of the final chewing gum composition.

7. The chewing gum composition of claim 1 wherein the chewing gum base is present in the amount of about 5% to about 45% by weight of the final chewing gum composition.

8. A chewing gum composition which comprises from about 5% to about 45% by weight chewing gum base, from about 25% to about 75% sweetener, about 0.1 to about 12% by weight water-soluble spherical particles having a bulk density from about 3.0 to about 6.0 lbs./cu. ft., about 0.05% to about 3.0% by weight flavoring agent, said flavoring agent being sorbed in the microporous channels of the spherical particles, and remaining ingredients selected from conventional chewing gum additives, all percentages being by weight of the final chewing gum composition.

9. The composition of claim 8 which additionally contains a material selected from the group consisting of plasticizers, softeners, elastomers, elastomer solvents, fillers, coloring agents and mixtures thereof.

10. The chewing gum composition of claim 8 wherein the gum base ingredient is selected from the group consisting of natural rubber, synthetic rubber, and mixtures thereof.

11. The composition of claim 10 wherein the natural rubber is selected from the group consisting of chicle, jelutong, balata, gutta-percha, lechi caspi, sorva and mixtures thereof.

12. The chewing gum composition of claim 10 wherein the synthetic rubber is selected from the group consisting of butadiene-styrene copolymers, polyisobutylene, isobutylene-isoprene copolymers and mixtures thereof.

13. The chewing gum composition of claim 8 wherein the sweeter is a water-soluble sweetening agent.

14. A method of preparing a chewing gum composition having flavor-sweetness enhanced release, which comprises:
 (a) admixing a chewing gum base at a temperature from about 70° C. to about 120° C. with a liquid softener to obtain a homogeneous pliable mixture;
 (b) while mixing add to the homogeneous pliable mixture, water-soluble spherical particles having a bulk density from about 3.0 to about 6.0 lbs./cu. ft. and having a flavoring agent sorbed therein;
 (c) add the remaining chewing gum ingredients; and
 (d) thereafter forming the mixture into suitable chewing gum shapes.

15. A method of preparing a chewing gum composition having flavor-sweetness enhanced release, which comprises:
 (a) admixing a chewing gum base at a temperature from about 70° C. to about 120° C. with a liquid softener to obtain a homogeneous pliable mixture;
 (b) add to the homogeneous pliable mixture a sweetening agent and water-soluble spherical particles having a bulk density from about 3.0 to about 6.0 lb./cu. ft and having microporous channels;
 (c) while continuing mixing, add a flavoring agent and optional remaining ingredients to uniformly mix the flavoring agent throughout the chewing gum base to enable the flavoring agent to be sorbed in the spherical particles; and
 (d) thereafter forming the mixture into suitable chewing gum shapes.

* * * * *